Patented July 5, 1938

2,122,572

UNITED STATES PATENT OFFICE 2,122,572

MANUFACTURE OF CELLULOSE DERIVATIVES

John Edward Jones and Arthur Charles Cox, Spondon, near Derby, England, assignors to Celanese Corporation of America, a corporation of Delaware No Drawing. Application February 24, 1937, Serial No. 127,523. In Great Britain February 2, 1937

11 Claims. (Cl. 260—101)

This invention relates to improvements in the manufacture of cellulose derivatives, and particularly to improvements in the manufacture of organic esters of cellulose.

The manufacture of cellulose acetate, as carried out industrially, is usually performed by introducing cellulosic materials, which may have been pretreated, into a mixture of acetic acid and acetic anhydride which contains sulphuric acid, e. g. in a proportion of 10–15 or 20% on the cellulose, as a catalyst. Pretreatment may be effected with acetic or formic acid, or acetic acid containing a small proportion of sulphuric acid, e. g. a proportion of the order of .5% of the weight of the cellulosic materials. The acetylation mixture is allowed to react at a comparatively low temperature, for example 20 to 25° C., until the cellulosic materials have been converted into cellulose triacetate, which is soluble in the acetic acid present. The cellulose acetate is then usually ripened, in order to render it soluble in acetone, after which it is precipitated, washed and dried.

It has now been discovered that the time of reaction may be reduced and products of improved clarity may be obtained if the cellulosic materials, which may have been pretreated, for example as described above, are treated with sulphuric acid in an anhydrous medium, and are subsequently acetylated. Preferably, the materials are impregnated with a mixture of glacial acetic acid, sulphuric acid and sufficient acetic anhydride to react with any water which may be present, for example in the cellulosic materials, or which may be formed, e. g. by reaction between the sulphuric acid and the cellulosic materials. The amount of sulphuric acid may for example be about 8–10 up to about 20% of the weight of the cellulose, and is preferably about 12–15%. The treatment may be carried out, for example, for about 15–30 minutes or an hour. Further quantities of acetic anhydride, e. g. of the order of 5–10% of the weight of the cellulosic materials, may be introduced during the course of the treatment. On completion of the treatment additional acetic anhydride required for acetylation may be added, preferably together with additional acetic acid. Preferably, this anhydride, and the acetic acid if employed, is cooled e. g. to a temperature of 5° C., 0° C. or lower. Preferably, the whole amount of the sulphuric acid necessary for acetylation is employed in the sulphuric acid treatment.

The amount of acetic anhydride present in the medium employed for the sulphuric acid treatment is preferably only sufficient to render the medium anhydrous by reaction with any water which is present or which may be formed, or at least is not present in substantially greater proportions. If thoroughly dried cellulosic materials are treated with a mixture of 100% acetic acid and strong sulphuric acid the acetic anhydride may be omitted. The sulphuric acid treatment may be effected at a comparatively low temperature, for example 10 or 15° C., or at a higher temperature, for example 25 or 35° C. or even 40° C. or more. The cellulosic materials may be introduced into the anhydrous acetic acid-sulphuric acid mixture as soon as it is formed, or the mixture may be allowed to stand for some time, for example 1 to 2 hours, prior to the introduction of the materials.

Acetylation may be carried out at a low temperature, for example 20 to 25° C. or even less, or at a higher temperature, for example a temperature of 30 to 35 or 40° C.

The following is an example of an acetylation process according to the present invention:—

About 8 parts by weight of cotton are pretreated with 4 parts by weight of glacial acetic acid and .04 part by weight of sulphuric acid for about 4 hours at 20 to 25° C. and are then introduced into a bath consisting of:—

| | Parts by weight |
|---|---|
| Glacial acetic acid (99.5%) | 26 |
| 98% sulphuric acid | 1.2 |
| 95% acetic anhydride | 3 |

The amount of acetic anhydride is sufficient to remove any water present in the cotton or formed by reaction between the sulphuric acid and the cotton. The cotton is introduced into this bath and is stirred for 20–40 minutes while the temperature is maintained at 25°–30° C. 28 parts by weight of a 65% solution of acetic anhydride in glacial acetic acid is then added and the mixture is stirred at a temperature of 35°–40° C. until the dope is free from fibre. Sufficient water is then incorporated to react with the excess acetic anhydride and to provide a further quantity of about 1.9 parts by weight for ripening, which is carried out for 60 to 70 hours, at the end of which time an acetone-soluble cellulose acetate of high clarity is obtained. The total time for the acetylation, including the treatment with the acetic acid-sulphuric acid mixture, is considerably less than that necessary for the production of similar cellulose acetate by the ordinary methods.

If desired the pretreatment with 4 parts of acetic acid and .04 part of $H_2SO_4$ may be omitted.

In order to obtain products which can be ripened easily without a tendency to gel it appears to be desirable that the sulphuric acid employed in the treatment bath should be present in a proportion of about 8% or more of the weight of the cellulosic material. With lower proportions difficulties may be encountered during ripening and the clarity of the product may be impaired.

While the invention has been described particularly with reference to the manufacture of cellulose acetate, it is also applicable to the manufacture of other organic esters of cellulose, including mixed esters, particularly lower fatty acid esters, for example cellulose propionate and cellulose butyrate, using the appropriate anhydrides and preferably also using the corresponding organic acids. Further, while sulphuric acid is the catalyst which gives the best results according to the present invention other polybasic inorganic acid catalysts may also be used, for example phosphoric acid or a mixture of phosphoric and sulphuric acids.

Having described our invention, what we desire to secure by Letters Patent is:—

1. Process for the manufacture of cellulose esters, which comprises subjecting cellulosic materials to treatment in a liquid medium comprising sulphuric acid in a proportion of at least 8% of the weight of the materials, an organic acid and only just sufficient organic acid anhydride to render and maintain the medium anhydrous by reaction with any water present or formed during the treatment, and then esterifying the pretreated materials.

2. Process for the manufacture of cellulose esters, which comprises subjecting cellulosic materials to treatment in a liquid medium comprising sulphuric acid in a proportion of at least 8% of the weight of the materials, a lower fatty acid and only just sufficient lower fatty acid anhydride to render and maintain the medium anhydrous by reaction with any water present or formed during the treatment, and then esterifying the pretreated materials.

3. Process for the manufacture of cellulose esters, which comprises subjecting cellulosic materials to treatment in a liquid medium comprising sulphuric acid in a proportion of 12 to 15% of the weight of the materials, a lower fatty acid and only just sufficient lower fatty acid anhydride to render and maintain the medium anhydrous by reaction with any water present or formed during the treatment, and then esterifying the pretreated materials.

4. Process for the manufacture of cellulose esters, which comprises subjecting cellulosic materials to treatment in a liquid medium comprising sulphuric acid in a proportion of 8 to 20% of the weight of the materials, a lower fatty acid and only just sufficient acetic anhydride to render and maintain the medium anhydrous by reaction with any water present or formed during the treatment, and then esterifying the pretreated materials.

5. Process for the manufacture of cellulose acetate, which comprises subjecting cellulosic materials to treatment in a liquid medium comprising sulphuric acid in a proportion of at least 8% of the weight of the materials, acetic acid and only just sufficient acetic anhydride to render and maintain the medium anhydrous by reaction with any water present or formed during the treatment, and then acetylating the pretreated materials.

6. Process for the manufacture of cellulose esters, which comprises subjecting cellulosic materials to treatment at a temperature of 20° to 25° C. in a liquid medium comprising sulphuric acid in a proportion of at least 8% of the weight of the materials, a lower fatty acid and only just sufficient lower fatty acid anhydride to render and maintain the medium anhydrous by reaction with any water present or formed during the treatment, and then esterifying the pretreated materials.

7. Process for the manufacture of cellulose esters, which comprises subjecting cellulosic materials to treatment for a period of 15 to 30 minutes in a liquid medium comprising sulphuric acid in a proportion of at least 8% of the weight of the materials, a lower fatty acid and only just sufficient lower fatty acid anhydride to render and maintain the medium anhydrous by reaction with any water present or formed during the treatment and then esterifying the pretreated materials.

8. Process for the manufacture of cellulose esters, which comprises subjecting cellulosic materials to treatment in a liquid medium comprising sulphuric acid in a proportion of at least 8% of the weight of the materials, a lower fatty acid and only just sufficient lower fatty acid anhydride to render and maintain the medium anhydrous by reaction with any water present or formed during the treatment, and then incorporating with the materials a mixture consisting of a lower fatty acid and a lower fatty acid anhydride, the anhydride being present in an amount sufficient to effect the desired degree of esterification and in a concentration of approximately 65%, and esterifying the materials.

9. Process for the manufacture of cellulose esters, which comprises subjecting cellulosic materials to treatment in a liquid medium comprising sulphuric acid in a proportion of at least 8% of the weight of the materials, a lower fatty acid and only just sufficient lower fatty acid anhydride to render and maintain the medium anhydrous by reaction with any water present or formed during the treatment, and then incorporating with the pretreated materials a liquid mixture of a lower fatty acid and sufficient lower fatty acid anhydride to effect the desired degree of esterification, said mixture being at a temperature of 0° to 5° C., and esterifying the materials.

10. Process for the manufacture of cellulose esters, which comprises subjecting cellulosic materials to treatment in a liquid medium which is at a temperature of 10 to 30° C., and which comprises sulphuric acid in a proportion of 8 to 20% of the weight of the materials, a lower fatty acid, and only just sufficient lower fatty acid anhydride to render and maintain the medium anhydrous by reaction with any water present or formed during the treatment, and then esterifying the pretreated materials with a lower fatty acid anhydride at a temperature of 20 to 35° C.

11. Process for the manufacture of cellulose acetate, which comprises subjecting cellulosic materials to treatment in a liquid medium which is at a temperature of 15 to 25° C., and which comprises sulphuric acid in a proportion of 8 to 20% of the weight of the materials, acetic acid and only just sufficient acetic anhydride to render and maintain the medium anhydrous by reaction with any water present or formed during the treatment, and then incorporating with the materials a mixture of acetic acid and acetic anhydride, the anhydride being present in an amount sufficient to effect the desired degree of esterification and in a concentration of approximately 65%, and acetylating the materials at a temperature of 20 to 35° C.

JOHN EDWARD JONES.
ARTHUR CHARLES COX.